United States Patent [19]
Link

[11] Patent Number: 6,082,038
[45] Date of Patent: Jul. 4, 2000

[54] SUSPENDED PIGMENT SILICONE LURE DRESSING

[76] Inventor: Donald Link, 1053 Legion St., Shakopee, Minn. 55379

[21] Appl. No.: 09/288,174

[22] Filed: Apr. 8, 1999

[51] Int. Cl.⁷ .......................... A01K 85/00; A01K 85/01
[52] U.S. Cl. ......................... 43/42.24; 43/42.3; 43/42.31
[58] Field of Search ................ 43/42.24, 42.28, 43/42.29, 42.3, 42.31, 42.32, 42.33, 42.37, 42.38; 264/73, 75–77

[56] References Cited

U.S. PATENT DOCUMENTS

| 1,538,909 | 5/1925 | Shannon | 43/42.29 |
|---|---|---|---|
| 1,593,604 | 7/1926 | Schreiner et al. | 43/42.3 |
| 1,730,333 | 10/1929 | Pflueger | 43/42.33 |
| 1,845,457 | 2/1932 | Walsh et al. | 264/73 |
| 1,989,704 | 2/1935 | Leguillon | 264/77 |
| 2,501,449 | 3/1950 | Lutz et al. | 43/42.3 |
| 3,341,396 | 9/1967 | Iverson | 264/73 |
| 3,802,115 | 4/1974 | Auten et al. | 43/42.31 |
| 4,074,454 | 2/1978 | Cordell, Jr. | 43/42.28 |
| 4,450,645 | 5/1984 | Ancona | 43/42.29 |
| 4,640,041 | 2/1987 | Stanley | 43/42.13 |
| 4,771,568 | 9/1988 | Head | 43/42.29 |
| 4,791,750 | 12/1988 | Gammill | 43/42.31 |
| 5,007,193 | 4/1991 | Goodley et al. | 43/42.28 |
| 5,230,178 | 7/1993 | Dillard | 43/42.31 |
| 5,244,942 | 9/1993 | Hover et al. | 264/75 |
| 5,251,395 | 10/1993 | Wicklund | 43/42.25 |
| 5,261,182 | 11/1993 | Link | 43/42.36 |
| 5,408,780 | 4/1995 | Chambers, Sr. | 43/42.24 |
| 5,426,886 | 6/1995 | Stanley | 43/42.31 |
| 5,499,471 | 3/1996 | Foutch et al. | 43/42.31 |
| 5,517,782 | 5/1996 | Link et al. | 43/42.31 |
| 5,524,377 | 6/1996 | Freeman et al. | 43/42.3 |
| 5,524,378 | 6/1996 | Hood | 43/42.31 |
| 5,709,047 | 1/1998 | Link | 43/42.31 |
| 5,899,015 | 5/1999 | Link | 43/42.39 |
| 5,960,580 | 10/1999 | Link | 43/42.53 |

Primary Examiner—Michael J. Carone
Assistant Examiner—Darren W. Ark
Attorney, Agent, or Firm—D. L. Tschida

[57] ABSTRACT

Multi-hued fishing lure dressings molded from a colored mixture that contains a contrasting, granular, partially dissolving color pigment. In one silicone rubber dressing, a multi-stranded skirt includes randomly suspended granules that exhibit blotches or speckles having indistinct edges. In another dressing, a silicone rubber trailer is disclosed that exhibits the general shape of a frog. One or more cavities support plug-in attachments, such as rattles or extension pieces that separately support other dressings. A pair of ribbed panels that imitate legs extend from the trailer and undulate with lure motion. The aesthetic effect is to create a multi-hued coloration at the dressing that imitates the coloration of many prey species.

20 Claims, 7 Drawing Sheets

SUSPENDED PIGMENT SILICONE LURE DRESSING

BACKGROUND OF THE INVENTION

The present invention relates to fishing lures and, in particular, to lure dressings, that are molded from silicone rubber mixtures that include granular pigments that partially dissolve to provide a mottled appearance, such as dressings that imitate prey species and/or multi-stranded elastomer skirts, and that are adaptable to support rattles and other lure accessories.

A dressing commonly mounted to fishing lures, such as jigs, "spinner baits" or "buzz baits", is a multi-stranded skirt. The skirts are typically fabricated from sheets of an elastomer material, such as natural rubber or silicone rubber. Each sheet is processed into a number of regions that define individual skirts and each skirt is defined by a multiplicity of slits or strands that are attached to solid borders that bound the ends of the strands. The skirts are cut from the sheets with the borders attached and the strands are contained by the borders, until the strands are collected and bound together.

Rubber bands and elastomer collars are frequently used to secure the strands together. After banding, the borders are cut from the strands and the skirt is ready to be mounted to a desired lure. Examples of banded skirts can be found at U.S. Pat. Nos. 4,640,041 and 5,251,395. Examples of "rollup" skirts or skirts with elastomer collars are shown at U.S. Pat. Nos. 5,517,782 and 5,709,047.

Rollup skirts are formed by rolling and bonding the border of a skirt to a tubular, elastomer core piece with an appropriate adhesive. Once bonded, the border is cutaway and the cut ends of the strands trail from the core piece. The core piece and wrapped skirt stretch when the skirt is mounted to a lure.

Most lures that use skirts include a molded lead head. Spinner baits also include a formed wire that protrudes from the head or body and support one or more metal blades that spin and vibrate as the lure is retrieved. A fishing line is attached to the wire or an eye of a hook that protrudes from the head or body. As the lures are retrieved, the strands of the skirt undulate with movement of the lure through water to entice a prey species of fish to strike.

Trailer dressings can be added to the hooks at the lures to increase the bulk of the presented offering. A trailer can also be added to customize a desired color scheme at the lure.

Most typically, one or more finished skirts and/or a single trailer are threaded over supporting appendages at the lure or the hook. The skirts and trailer can have the same or different colors. The skirt color is normally determined by colored pigments that disperse evenly through the rubber mixture and define a continuous hued color. Each dressing, especially silicone rubber dressings exhibit a single color. Occasionally, multiple colors are combined by aligning strips of the rubber together before curing. Metal flakes or glitters are occasionally added to the mixtures to accentuate the color.

Normal silicone rubber processing techniques do not accommodate fabricating dressings that exhibit multiple hues. Consequently, the aforementioned need to secure multiple dressings to a single lure to obtain a desired color combination.

The silicone rubber skirts and trailers of the present invention were developed to provide dressings that exhibit multi-hued, mottled coloration's. The dressings particularly exhibit mottled, natural or earthen coloration's. Splotches of dark, partially dissolved pigment granules are suspended in the dressing and contrast to the primary color. Trailer dressings having similar color schemes are also disclosed. The trailers include shaped cavities that support rattles and/or plug-in, attachment pieces that separately support one or more rattles and/or multi-stranded skirts.

SUMMARY OF THE INVENTION

It is accordingly a primary object of the invention to provide a multi-hued, mottled lure dressing.

It is a further object of the invention to provide a dressing containing a randomly distributed, partially dissolved suspension of a granular pigment that contrasts with a base color.

It is a further object of the invention to provide a trailer dressing that contains a randomly distributed, partially dissolved suspension of a granular pigment that contrasts with a base color.

It is a further object of the invention to provide a silicone rubber trailer dressing that exhibits the general shape of a frog and includes flexible, ribbed legs.

It is a further object of the invention to provide a trailer dressing that contains one or more molded cavities that receive a rattle or plug-in extension piece that supports accessory dressings, such as rattles and/or multi-stranded skirts.

The foregoing and other objects, advantages and distinctions of the invention are obtained in a number of presently preferred, silicone rubber dressings. In one dressing, a multi-stranded skirt is molded from a colored mixture that contains a contrasting, granular, partially dissolving color pigment. The granules are randomly suspended in the molded dressing. The granules exhibit blotches or speckles having indistinct edges. The aesthetic effect is to create a multi-hued, mottled coloration at the dressing that imitates the coloration of many bait or prey species.

In another dressing, a silicone rubber trailer is disclosed that exhibits the general shape of a frog. One or more cavities are provided that support plug-in attachments, such as rattles or extension pieces that separately support other dressings. A pair of relatively thin, appendages having a series of displaced lateral ribs that imitate legs extend from the trailer and undulate with lure motion.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
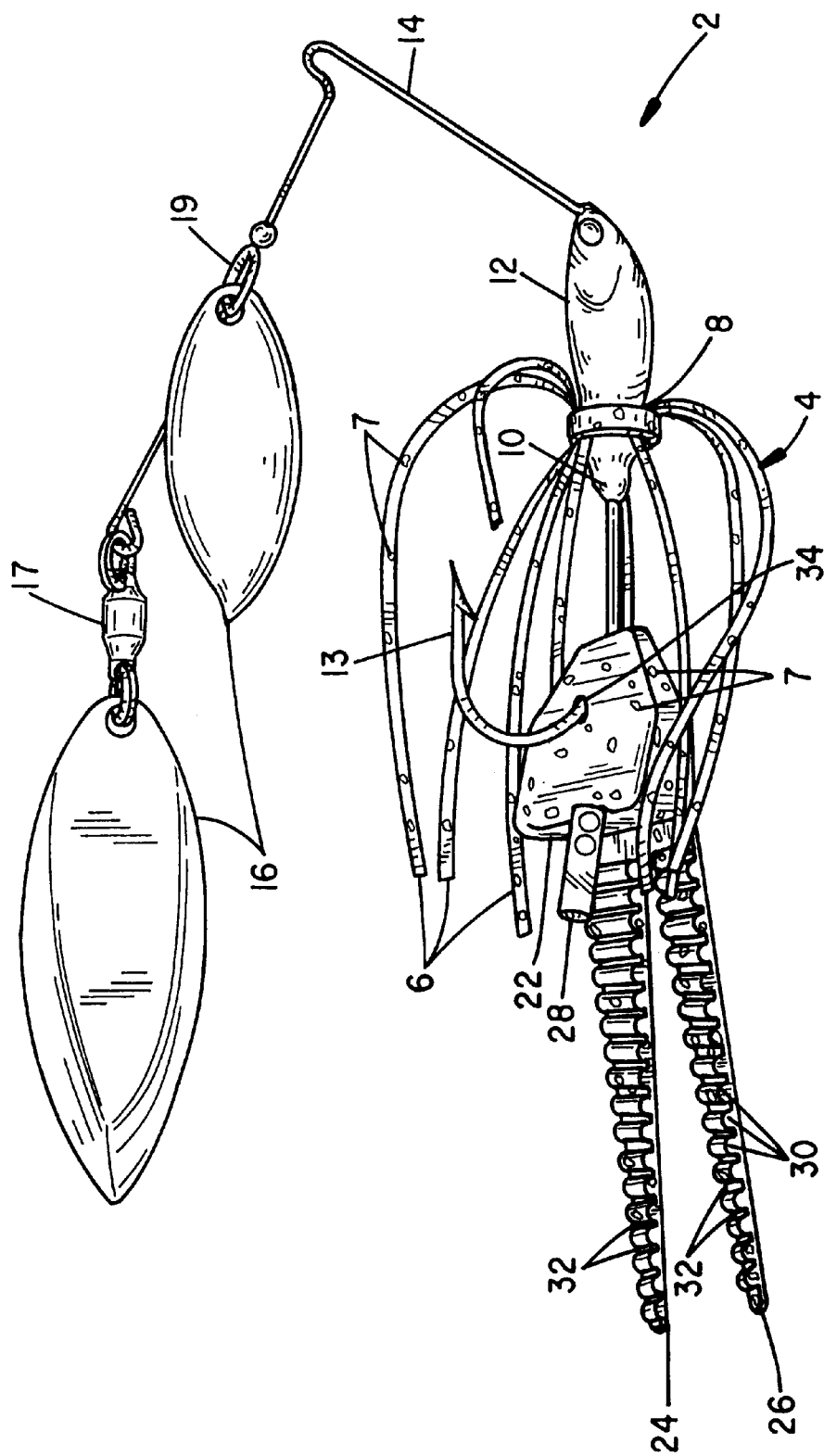
FIG. 1 is a plan drawing to a typical spinner bait outfitted with a natural appearing skirt and a frog-like trailer dressing containing plug-in rattle according to the invention.
Figure 2:
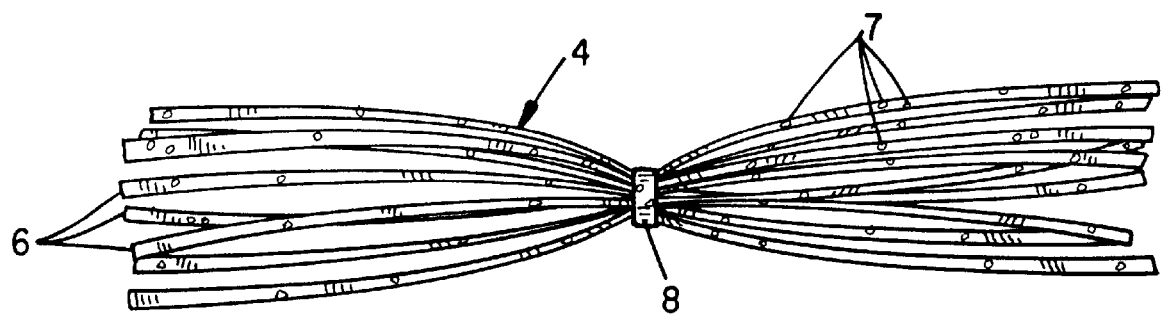
FIG. 2 is a plan view of a typical banded skirt containing contrasting pigment blotches.

Referring to FIG. 1, a spinner bait 2 is shown that is fitted with a skirt 4. A detailed drawing of the skirt 4 is shown in FIG. 2 as it appears when detached from the lure 2. The skirt 4 includes a number of strands 6 that are bound together with a band 8. The length and shape of the strands 6 can be varied. The number, coloration and/or surface ornamentation of the strands 6 can be varied as desired. The skirt 4 particularly includes suspended, partially dissolved pigment granules 7 that contrast with a primary color to define a multi-hued, mottled color scheme that imitates a natural prey species.

The skirt 4 is preferably formed from an elastomer material, such as natural, latex or silicone rubber. The band 8 is also typically formed from an elastomer material, although could be constructed from other materials, including plastics or polymers.

The band 8 is elastic so that it can expand and contract to secure the skirt 4 to the contours of an appendage 10 of the lure head or body 12. A barbed-hook 13 projects from the appendage 10. A formed wire 14 projects from the body 12 and supports a pair of spinner blades 16. The spinner blades 16 are secured to the wire 14 with swivels 17 and/or devises 19. The blades 16 are stamp formed from metal and can be obtained in a variety of types, finishes and sizes. With lure movement, the blades 16 rotate and flutter, along with the strands 6. The number and mounting of the blades 16 can be varied.

Threaded to the hook 13 is a trailer dressing 20, see also FIGS. 3 through 8. The dressing 20 is molded to imitate a frog. The dressing 20 is preferably molded from a silicone rubber, although can be molded from natural or latex rubber, plastisol or other materials.

The dressing 20 includes a tapered head 22, trailing appendages 24 and 26 and a rattle 28. The appendages 24 and 26 are molded to imitate legs and include a series of raised ribs 30 and recesses 32 that extend laterally over a top surface of each appendage 24 and 26. A bottom surface 31 of the dressing 20 is flat, although can be molded with a distinct shape. The recesses 32 between the ribs 30 allow the appendages 24 and 26 to undulate with normal motion through water. A depression or aperture 34 at the head 22 accepts the hook 13, although the hook 13 can be threaded through the head 22 in any desired fashion.

The skirt 4 and/or dressing 20 may also be mounted to a jig type of lure. In this instance, a looped eye extends from the fore-end of the body 12 in lieu of the wire form 14. A fishing line (not shown) attaches to the eye.

Although a frog-like trailer 20 is shown at FIGS. 1 and 3–8, the dressing 20 can be constructed to any desired shape. Preferred shapes are those that mimic prey or bait species, for example, worms, minnows, salamanders, crayfish, beetles or other natural or unnatural creatures. The pattern and shapes of the ribs 30 and recesses 32 can be varied as desired in relation to the shape of the dressing 20. The relative location of the ribs 30 and recesses 32 can be varied to also create a preferred movement.

A typical formulation used to mold the multi-hued skirt 4 and/or trailer dressing 20 includes 5 pounds of silicone rubber (e.g. Wacker Co. silicone R263/50), 1.4 grams purple #06 and 27.5 grams peroximon F/R. A suitable quantity of a finely ground primary pigment in the range of 0.5 to 8 grams is also included to establish the primary color of the dressing 20. The peroximon serves as a curing catalyst.

The molding parameters of each dressing 4 and 20 may vary. Generally, however, the mixture is processed in conventional fashion to form a pliable, silicone rubber pre-form. The partially dissolved granules 7 of the purple or blue pigment are bound in the pre-form. For the skirt 4, the pre-form is next pressed in a suitable mold for approximately 2 minutes at approximately 350 degrees Fahrenheit. The molded sheet is removed and placed on a hot plate at approximately 350 degrees Fahrenheit for an additional 2 minutes to set the dispersed, partially dissolved pigment. The mold time can be adjusted in a range of 330 to 350 degrees Fahrenheit and the cure time can be adjusted in a range of 90 to 180 seconds.

The purple #06 pigment is purchased from M-F Manufacturing, Fort Worth, Tex. Another pigment that exhibits the desired mottling or blotching effect is sold under the name Blue Macrolux RR Gran by the Bayer Co. Both pigments are obtained in granular form, which is unusual, since a preferred form is to finely grind the pigment to obtain complete dispersal. The foregoing pigments are normally sold for use in plastisol mixtures and in which they apparently evenly dissolve. When used in a silicone rubber mixture at the foregoing concentrations, however, the pigment granules 7 only partially dissolve and randomly suspend in the mixture. The granules 7 become bound as contrasting blotches 7 at the dressings 4 and 20. A desired, multi-hued, mottled color is thereby obtained that imitates the coloration of natural baits. The colors are also substantially different from that obtained using existing processes and mixtures.

Other ingredients can be added to the dressing mixtures to vary the qualities and properties of the dressings 4 and 20. The exposed surfaces of the dressings 4 and 20 can also be printed with suitable inks, such as room temperature vulcanization (RTV) inks described by applicant in another pending application. The dressings 4 and 20 can also be covered with patterned laminates, such as foils.

Figure 3:
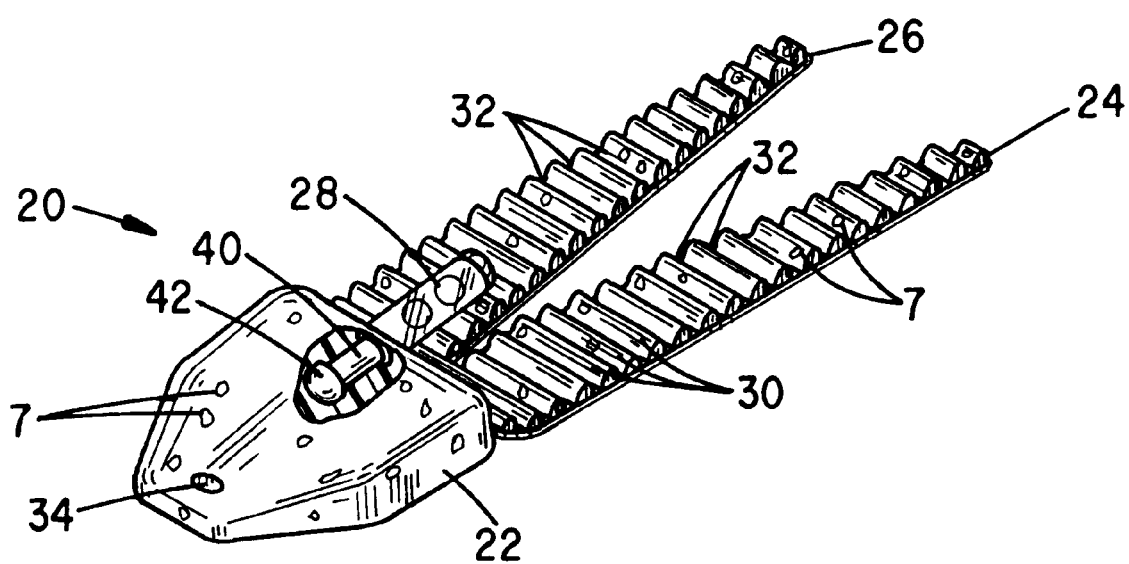
FIG. 3 is a perspective view shown in partial cutaway to the frog-like trailer dressing of FIG. 1.
Figure 4:
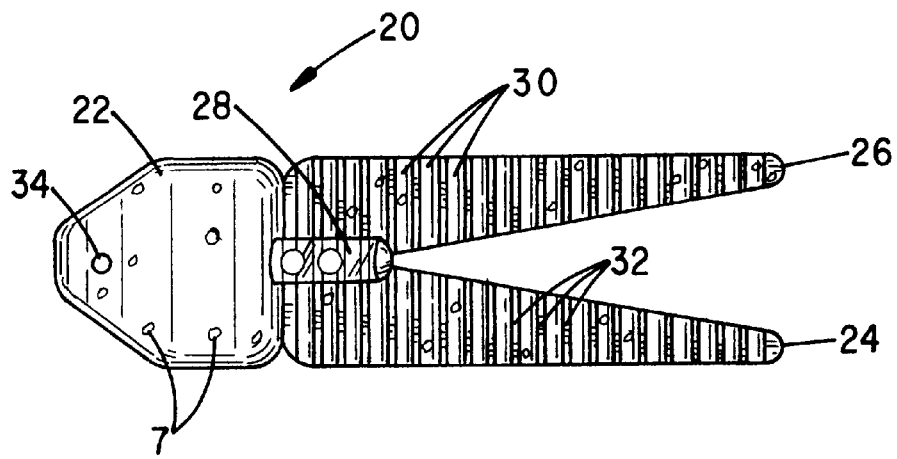
FIG. 4 is a top view of the trailer dressing of FIG. 3.
Figure 5:
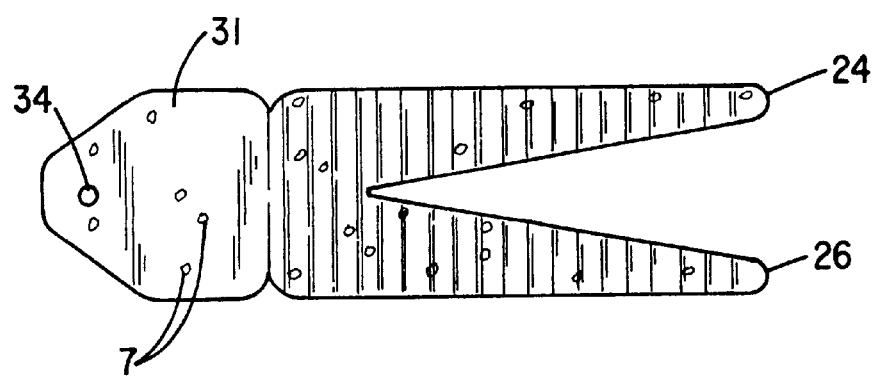
FIG. 5 is a bottom view of the trailer dressing of FIG. 3.
Figure 6:
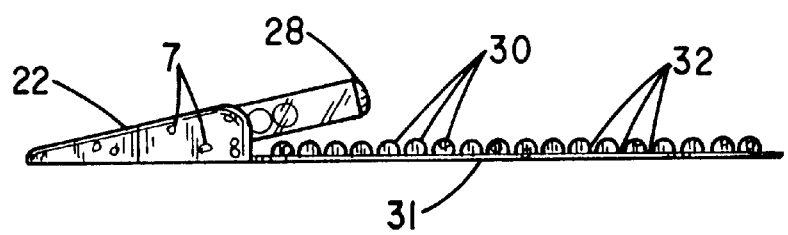
FIG. 6 is a right side view of the trailer dressing of FIG. 3.
Figure 7:
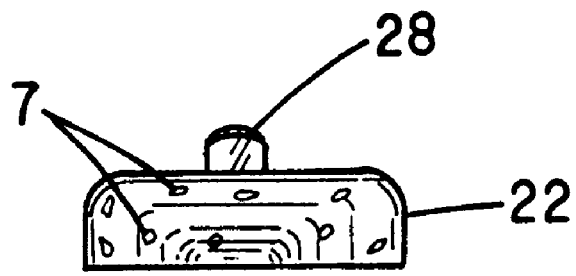
FIG. 7 is a front view of the trailer dressing of FIG. 3.
Figure 8:
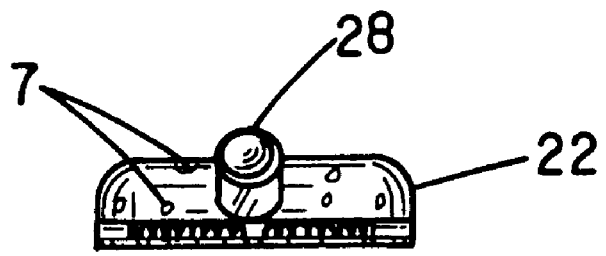
FIG. 8 is a rear view of the trailer dressing of FIG. 3.

Returning attention to the cutaway portion of FIG. 3, the manner of the mounting of the rattle 28 is shown. The rattle 28 is particularly secured at a cavity 40 that exhibits a shape complementary to a flanged head 42 at the rattle. The rattle 28 can be removed or mounted as desired to enhance the fish attracting properties of the trailer 20. Although a single cavity 40 is shown, multiple cavities 40 and rattles 28 can be included at the dressing 20.

Figure 9:
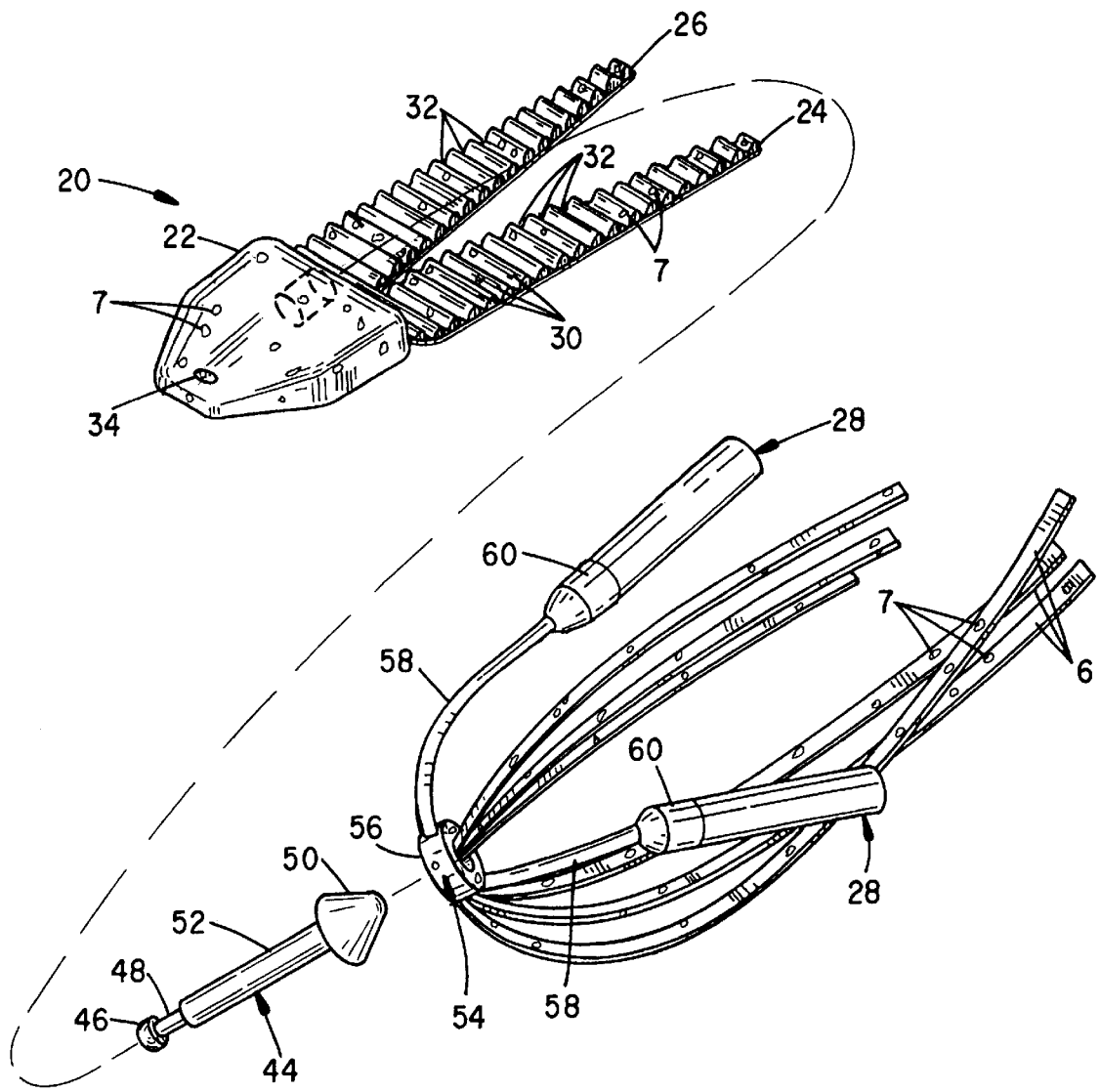
FIG. 9 is a perspective view shown in partial exploded assembly to the frog-like trailer dressing of FIG. 1 and a plug-piece, rattle strap and skirt that can be attached to the trailer.

FIG. 9 shows an alternative attachment or plug-in piece 44 that can be mounted to the cavity 40. A head 46 extends forward of a groove 48 and mounts within the cavity 40. A bulbous stop member 50 radiates from an intermediate extension shaft 52 and is exposed at the aft end of the attachment piece 44. An elastomer strap assembly 54, in turn, mounts to the shaft 52. The strap assembly 54 is secured at a bored collar 56 that expands to mount over the stop member 50. Filaments 58 project from the collar 58 and retain a pair of rattles 28 at end caps 60. Cavities within the end caps 60 include recesses that accept a flanged head at the rattles 28. A skirt 4 can also be bound to the attachment piece 44 at the collar 56. The skirt 4 can be colored as desired and can include the suspended pigment granules 7.

Figure 10:
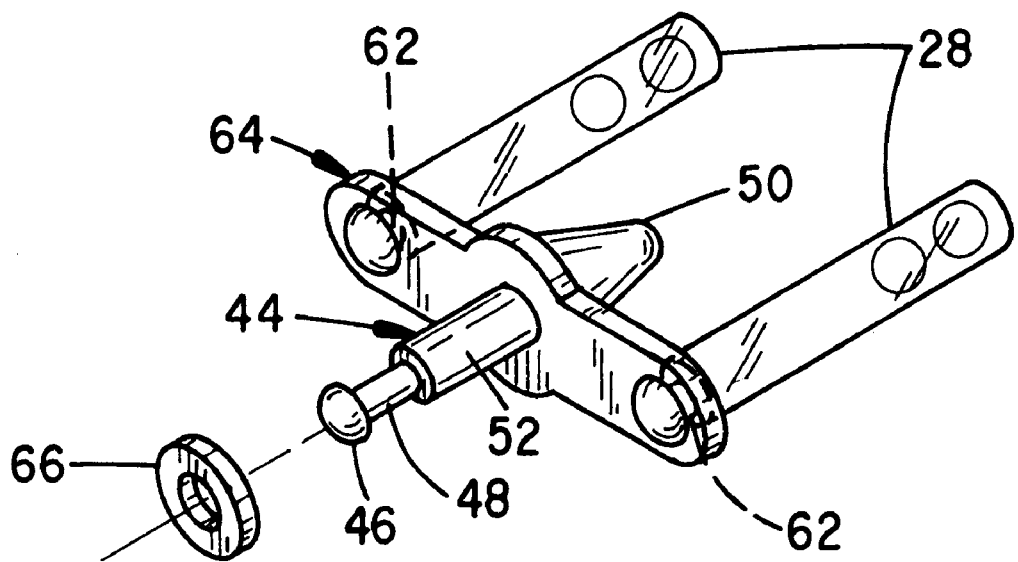
FIG. 10 is a view shown in partial exploded assembly to an alternative rattle holder and rattles mounted to a plug-piece and which can separately support a multi-stranded skirt.

FIG. 10 shows another alternative arrangement of rattles 28 at an attachment piece 44 that can be mounted to a dressing 20. The rattles 28 are secured to bores 62 at a plastic or elastomer flange piece 64. The flange piece mounts to the shaft 52 and displaces the rattles 28 to the side of the dressing. A separate band 66 is shown that can be used in conventional fashion to secure a multi-stranded skirt 4 of suitable color to the dressing 20.

Although the invention is described with respect to fishing lure dressings the processes can be applied to mold and color other silicone rubber products prepared from silicone rubber substrates. The concentrations of the mixture components and molding characteristics may have to be tailored to the different applications. The following claims should therefore be interpreted broadly to include all equivalent constructions within the scope of the wording.

What is claimed is:

1. A fishing lure dressing comprising a body molded from a mixture containing silicone rubber, a primary color pigment that evenly dissolves in the mixture, a catalyst and a plurality of partially dissolved pigment granules that contrast with the primary color and wherein said granules are randomly supported in suspension in the body.

2. A fishing lure dressing as set forth in claim 1 wherein a housing containing a rattle bead extends from said body.

3. A fishing lure dressing as set forth in claim 1 wherein said body includes a cavity that is shaped to detachably support a flanged head that projects from a housing that includes a plurality of rattle beads therein.

4. A fishing lure dressing as set forth in claim 1 wherein said body includes a cavity that is shaped to detachably support a flanged head of an extension piece in said cavity, wherein an elastomer collar mounts to said extension piece, and wherein an elastomer filament extends from said collar and contains a rattle in a cavity formed at a distal end of the filament.

5. A fishing lure dressing as set forth in claim 4 including a multi-stranded skirt supported on said extension piece by said collar.

6. A fishing lure dressing as set forth in claim 1 wherein said body includes a cavity that is shaped to detachably support a flanged head of an extension piece in said cavity, wherein an elastomer collar piece mounts to said extension piece, and wherein a bore of the collar piece contains a rattle.

7. A fishing lure dressing as set forth in claim 1 wherein said body includes a cavity that is shaped to detachably support a flanged head of an extension piece in said cavity, wherein an elastomer collar mounts to said extension piece, and wherein a plurality of filaments extend from said collar and contain a plurality of rattles in cavities formed at distal ends of the filaments.

8. A fishing lure dressing as set forth in claim 1 wherein said body comprises a plurality of filamentary strands and means for binding said strands together.

9. A fishing lure dressing as set forth in claim 1 wherein said body includes first and second appendages that extend from an aft surface of said body and wherein said first and second appendages exhibit a thickness substantially less than that of the body and are shaped to undulate relative to said body.

10. A fishing lure dressing as set forth in claim 9 wherein each of said first and second appendages have a flat surface and an opposite surface that contains a plurality of seriatim raised ribs.

11. A fishing lure dressing as set forth in claim 1 and wherein said dressing is mountable to a fishing lure having a head and a hook extending from said head.

12. A fishing lure dressing as set forth in claim 1 wherein said body includes an appendage having a surface that contains a plurality of seriatim raised ribs.

13. A fishing lure dressing comprising a skirt having a plurality of strands molded from a mixture containing silicone rubber, a primary color pigment that evenly dissolves in the mixture, a catalyst and a plurality of partially dissolved pigment granules that contrast with the primary color and wherein said granules are randomly supported in suspension in the strands.

14. A fishing lure dressing as set forth in claim 13 and wherein said skirt is mountable to a fishing lure having a head and a hook extending from said head.

15. A fishing lure dressing, comprising:

a) a plurality of silicone rubber strands that exhibit a primary color and means for binding the strands together; and b) wherein a plurality of partially dissolved pigment granules that contrast with the primary color and wherein said granules are randomly supported in suspension in a plurality of the strands.

16. A fishing lure dressing as set forth in claim 1 wherein the granules exhibit a purple color.

17. A fishing lure dressing as set forth in claim 1 wherein the means for binding the strands together comprises an elastic band.

18. A fishing lure comprising:

a) a head and a hook extending from said head; and b) a skirt having a plurality of strands molded from a mixture containing silicone rubber, a primary color pigment that evenly dissolves in the mixture, a catalyst and a plurality of partially dissolved pigment granules that contrast with the primary color and wherein said granules are randomly supported in suspension in the strands and wherein the skirt is mounted to said head such that said strands obscure said hook.

19. A fishing lure as set forth in claim 18 including a dressing mounted to said hook having a body and first and second appendages that trail from said body, wherein said first and second appendages each exhibit a thickness substantially less than that of said body and are shaped to undulate relative to said body and wherein said dressing includes a plurality of partially dissolved pigment granules that contrast with a primary color and that are randomly supported in suspension in the body and first and second appendages.

20. A fishing lure dressing as set forth in claim 19 wherein a housing containing a rattle bead therein extends from said body.

* * * * *